No. 884,893. PATENTED APR. 14, 1908.
H. BROOME.
MACHINE FOR SLICING MEATS.
APPLICATION FILED MAY 8, 1907.
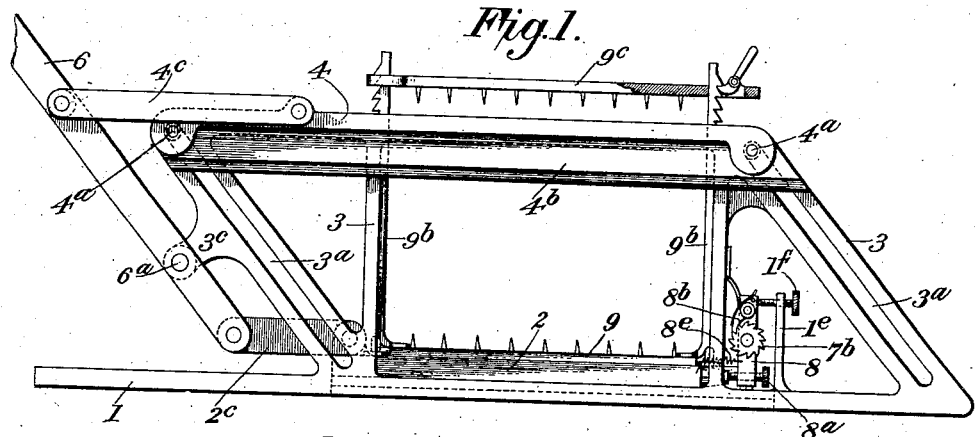
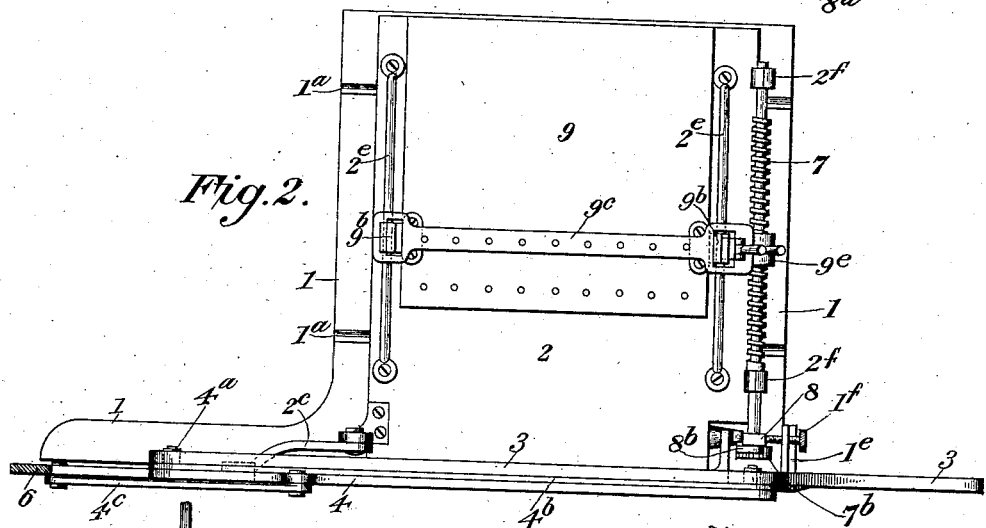
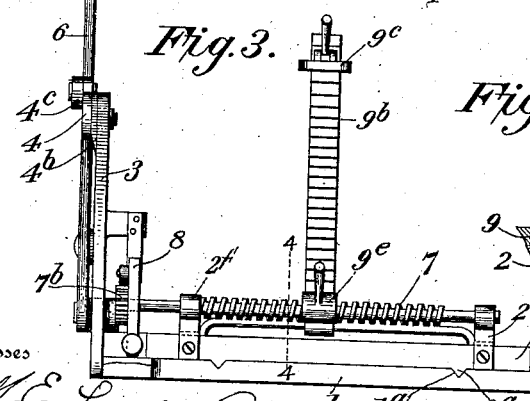
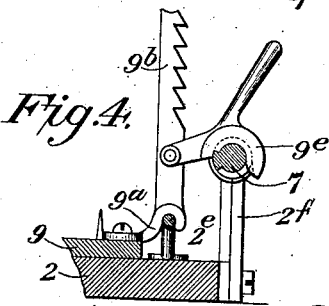
Witnesses
Inventor:
Henry Broome
By Alexander F. Powell
Attorneys

UNITED STATES PATENT OFFICE.

HENRY BROOME, OF SPRINGFIELD, OHIO, ASSIGNOR OF ONE-THIRD TO WILLIAM DENNICK, OF DAYTON, OHIO, AND ONE-THIRD TO CLAUDE W. FLICK, OF SPRINGFIELD, OHIO.

MACHINE FOR SLICING MEATS.

No. 884,893.     Specification of Letters Patent.     Patented April 14, 1908.

Application filed May 8, 1907. Serial No. 372,500.

*To all whom it may concern:*

Be it known that I, HENRY BROOME, of Springfield, in the county of Clark and State of Ohio, have invented certain new and useful Improvements in Machines for Slicing Meats; and I hereby declare that the following is a full, clear, and exact description thereof, reference being had to the accompanying drawings, which form part of this specification.

This invention is an improvement in machines for slicing meats, bread, vegetables and the like, and its object is to provide a machine which will be simple and efficient in construction and can be operated more quickly than the ordinary machines.

The improved slicing machine has a reciprocating knife, and an oppositely reciprocating table, upon which latter the meat or article to be sliced is carried, means being provided to feed the meat forward to and under the knife between the slicing operations so that all the operations of cutting the meat can be performed automatically.

The invention consists in the novel combinations and constructions of parts in the machine as hereinafter described and claimed; and I will now describe the machine in detail with reference to the accompanying drawings, which illustrate a practical form thereof—Figure 1 being a front elevation of the machine; Fig. 2 a plan view thereof; and Fig. 3 a side view. Fig. 4 is a detail.

The machine has a base 1, upon which is mounted a movable table 2 which may be provided with transverse ribs $2^a$ on its under side engaging corresponding grooves $1^a$ in the upper side of the base to guide the table in its movements.

To the front end of the base 1 is attached an upstanding metal frame 3, which is provided with inclined slots $3^a$ at opposite ends, forming guides for a sliding knife-bar 4 which has studs $4^a$ on its ends, engaging slots $3^a$, said studs being preferably provided with rollers to lessen friction. Said bar 4 carries a knife $4^b$ of usual construction, adapted to slice the meat projecting below the knife over the edge of table 2.

As shown in the drawings the knife-bar 4 is connected by a link $4^c$ to a lever 6 pivoted at $6^a$ (below link $4^c$), on a projection $3^c$ on frame 3; and the lower end of lever 6 is connected (below pivot $6^a$), by a link $2^c$ with table 2, so that when lever 6 is oscillated the knife and table will be simultaneously moved in opposite directions, and owing to the inclined guide-slots $3^a$, the knife will on one stroke move downward toward the table and make a shearing cut and will rise on the return stroke. This opposite simultaneous movement of the knife and table is one of the features of the invention, and obviously greatly shortens the stroke of both knife and table, and of the operating lever 6.

Upon the table 2 is a sliding platform 9 which is movable transversely of the table to and from frame 3, being guided on the table in any suitable manner; as shown it is provided with castings $9^a$ on each side, engaging guide-wires $2^e$ on table 2.

From castings $9^a$ rise upstanding bars $9^b$ which form guides for a retainer bar $9^c$ by which the meat can be held upon the platform.

The platform can be moved forward automatically during the slicing process by means of a worm 7 journaled in supports $2^f$ on one side of the table 2, and adapted to be engaged by a catch $9^e$ pivoted to the platform, so that it can be disengaged from the worm to adjust the platform more quickly to or from the knife. The worm has a ratchet $7^b$ on one end adapted to be engaged by a pawl $8^b$ pivoted on the upper end of a lever 8 loosely hung on the worm shaft beside the ratchet $7^b$, and having a tappet bolt $8^a$ in its lower end adapted to engage the adjacent edge of table 2 and regulate the normal position of the lever 8. The dog can be retracted by a spring, such as $8^e$, connected to the table 2 and to the lever 8. The movement of the pawl to turn the ratchet is regulable by a stop screw $1^f$ tapped through a standard $1^e$ on the base 1, with which stop the lever contacts when the table moves to the right.

Operation. The meat or object to be sliced is laid on platform 9 and secured by bar $9^c$, the platform is then moved forward on the table 2 until the meat comes under the knife $4^b$; then catch $9^e$ is engaged with worm 7, and the machine operated by vibrating lever 6. As the knife moves forward and down, the table moves back, thus producing a quick shearing cut on the meat, with a short stroke of the lever, and each time the knife is raised the table 2 is moved forward so as to cause stop $1^f$ to actuate lever 8 and through worm 7 impart a forward feeding movement to the platform 9.

Having described my invention what I claim as new and desire to secure by Letters Patent is:

1. In a slicing machine, the combination of a knife, a table and means for reciprocating the knife and table simultaneously in opposite directions; with means for moving the material on the table toward the knife after each cutting operation.

2. In a slicing machine, the combination of a knife, a table, means for reciprocating the table and knife simultaneously in opposite directions, and means for raising and lowering the knife as it reciprocates; with means for feeding the material on the table toward the knife after each cutting operation.

3. In a slicing machine, the combination of a reciprocating knife, inclined guides for said knife, a reciprocating table, and means for reciprocating the knife and table simultaneously in opposite directions; with a movable platform on said table, and means for moving the platform toward the knife after each cutting operation.

4. In a slicing machine, the combination of a knife, a table, means for reciprocating the table and knife simultaneously in opposite directions, and means for raising and lowering the knife as it reciprocates; with a movable platform on said table, a worm and clutch for moving said platform, a ratchet on the worm shaft, a lever pivoted on the worm shaft beside the ratchet, a pawl on the lever engaging said ratchet, and a relatively stationary stop for arresting the movement of said lever.

5. In a slicing machine, the combination of a base, a guide frame attached thereto, a knife bar mounted on said frame, a table supported on the base, a lever pivoted to the frame, and connections between said lever and knife and table for reciprocating them in opposite directions; with a platform on the table, a worm and connections for moving the platform, a lever pivoted on the worm shaft, a ratchet on the shaft beside the lever, a pawl on said lever engaging the ratchet, and means for oscillating said lever when the knife is retracted.

In testimony that I claim the foregoing as my own, I affix my signature in presence of two witnesses.

HENRY BROOME.

Witnesses:
F. B. Chappel,
C. C. Leslie.